Oct. 16, 1945.   W. O. BENNETT, JR   2,387,112
WELDING
Filed Sept. 4, 1942   3 Sheets-Sheet 2
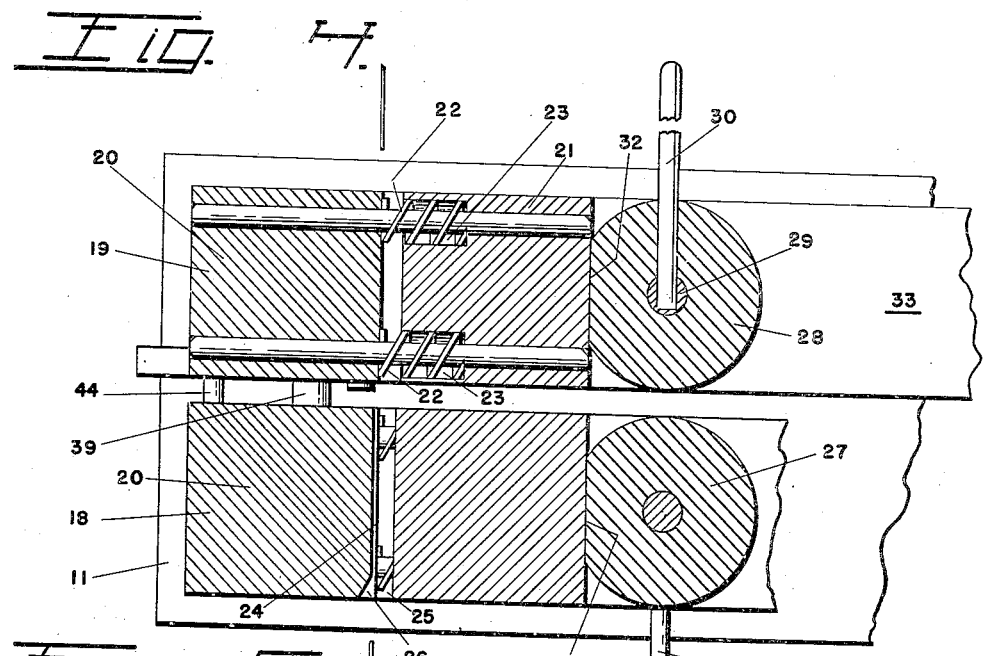
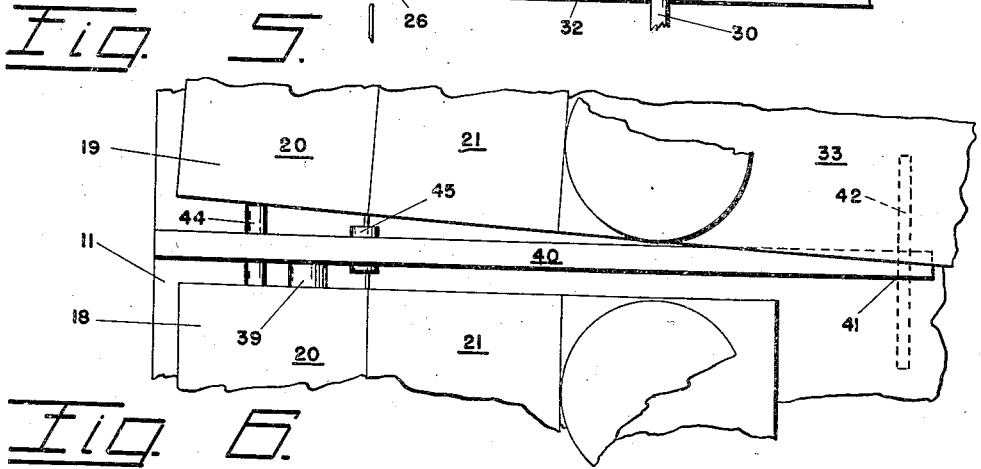
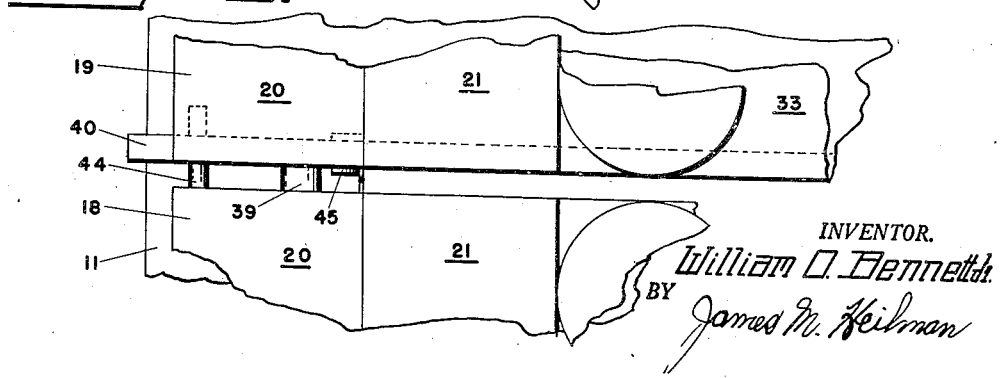
INVENTOR.
William O. Bennett Jr.
BY James M. Heilman

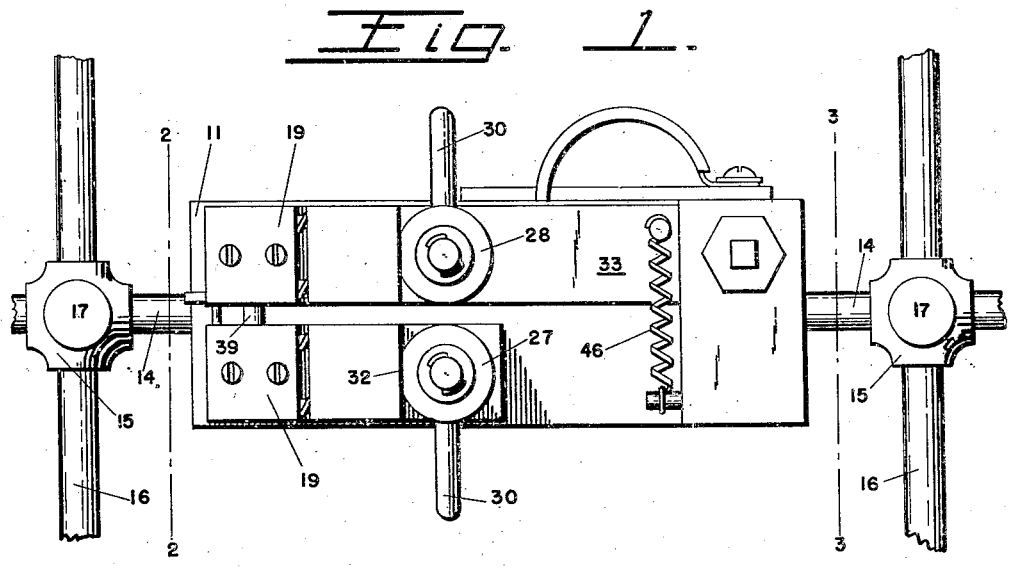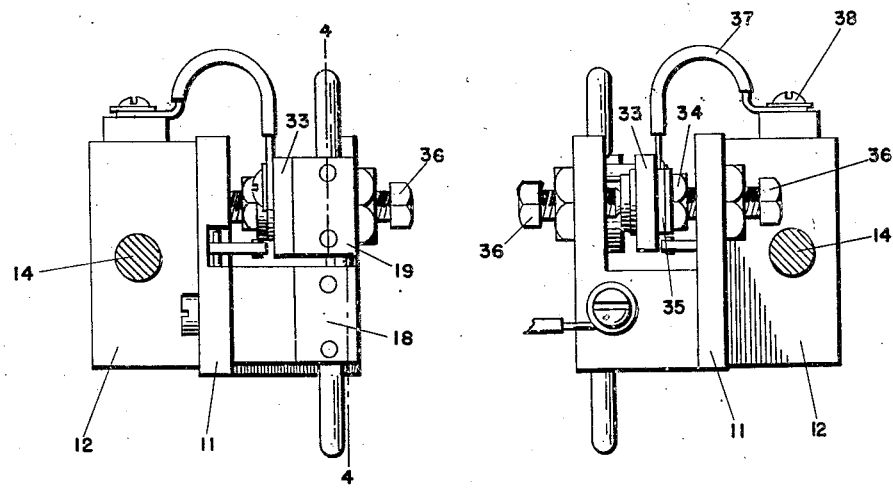

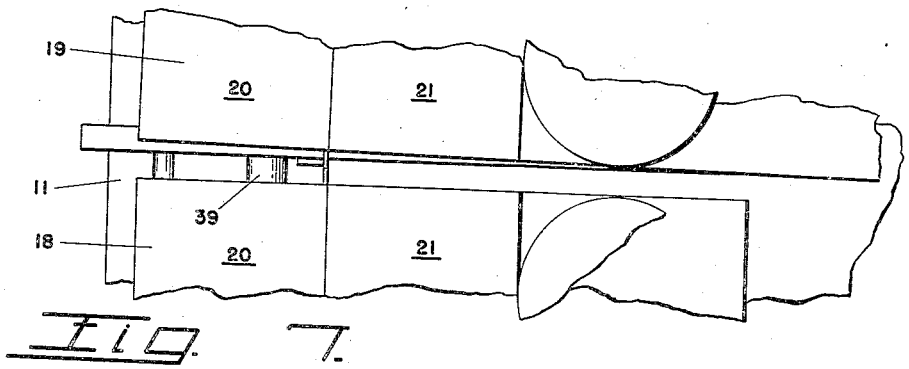
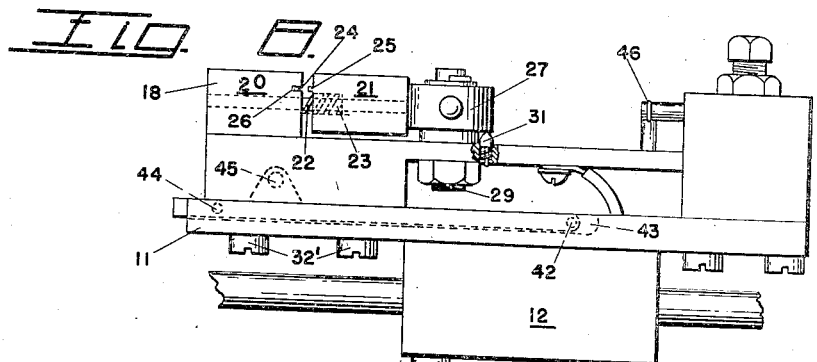
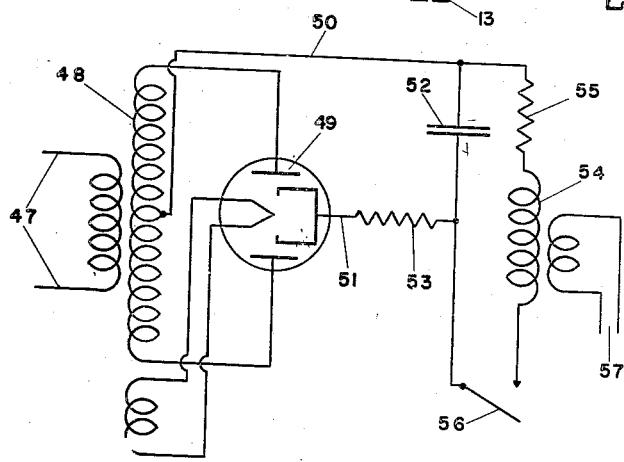
INVENTOR.
William O. Bennett Jr.
BY James M. Heilman Patented Oct. 16, 1945

2,387,112

UNITED STATES PATENT OFFICE 2,387,112

WELDING

William Ogle Bennett, Jr., Lancaster Township, Lancaster County, Pa., assignor to Hamilton Watch Company, Lancaster, Pa.

Application September 4, 1942, Serial No. 457,267

3 Claims. (Cl. 219—4)

This invention relates to the method and apparatus or butt welding fine wire.

It further relates to a machine which without any special knowledge of welding on the part of the operator will accurately and uniformly butt weld such fine wire as used in the manufacture of hairsprings or the like.

In certain operations in which spring wire is used in lengths of approximately 100 feet and where the wire is made of an alloy which is particularly expensive, said wire is supplied in lengths of from 105 feet to 380 feet, leaving lengths of from 5 feet to 80 feet which cannot be utilized in the manufacture of articles where the need is for approximately 100 feet. It would, therefore, be a great saving in alloy spring wire of this type if the short pieces could be butt welded into lengths of approximately 100 feet and thus utilized.

The process, which is the subject of this invention, is used in the production of springs which are formed by wrapping a continuous length of wire about 100 feet in length about a bar, heat treating said bar and dividing the wrapped wire into the desired springs. The alloy which is used for this spring is very expensive and is made up in lengths of wire as it is drawn from the ingot and these lengths vary by as much as 80 feet, leaving short lengths after a single bar has been wrapped. It would be particularly advantageous and economical if these short lengths could be butt welded together to form a wire sufficiently long to make one wrapping of a bar. By means of the apparatus hereinafter described this is accomplished and the short ends of wire which would otherwise be lost are utilized.

The object of the present invention is to butt weld short lengths of wire to form lengths of approximately 100 feet.

A further object is to provide a welding process wherein the welding current is metered both as to its intensity and duration.

A further object is to provide an apparatus which will support the ends of the wire to be welded in exact abutting relation.

A further object is to provide an apparatus which can be operated by a person having no special knowledge of welding, the apparatus presenting the work in desired position and delivering the necessary current to effect the welding operation.

A further object of this invention is to calculate and deliver to the ends of held wires, a single instantaneous welding flash that will produce the desired weld.

A further object is to provide an apparatus for varying the welding charge delivered to the wire to allow different size wires to be welded with the same apparatus.

The invention is illustrated in the accompanying drawings in which

Fig. 1 is a front plan view of the apparatus.

Fig. 2 is an end view taken on line 2—2 on Fig. 1.

Fig. 3 is an end view taken on line 3—3 of Fig. 1.

Fig. 4 is a cross section on line 4—4 of Fig. 2, showing the stop in full lines.

Fig. 5 is a broken detail showing the wire in place with the movable vise in raised position.

Fig. 6 is a broken detail plan showing the completed weld and the movable vise resting on the stop.

Fig. 7 is a broken detail plan showing the wire in abutting position just previous to the welding operation.

Fig. 8 is a bottom plan view.

Fig. 9 is a wiring diagram of that part of the apparatus directed to the preparation of the welding charge.

The welding apparatus may be divided into two parts, the vise for holding the work and making electrical contact between the ends of the wire and the apparatus for supplying, measuring and delivering the welding current.

In referring to that part of the apparatus for holding the wire in position to be welded, a base 11 is mounted on a base block 12 and securely held by bolts not shown. This base block 12 is slidably and rotatably carried on a rod 14 which is supported at each end by sockets 15. These sockets are slidably mounted on vertical rods 16 which have bases (not shown) for holding the entire apparatus in desired position. Set screws 17 are used to hold the apparatus at the desired height and angle. This allows the vise portion to be positioned just above the bar to be wound so that should the wire be too short to finish a complete winding, a second piece of wire may be welded without removing the bar from the winding lathe.

The welding fixture proper consists of two vises 18 and 19, both of which are identical except for their mounting. Each of these vises comprises a stationary jaw 20 and a movable jaw 21. The movable jaw has secured thereto a pair of parallel rods 22 which are slidably carried in the stationary jaw 20. Springs 22 carried in sockets 23 in the movable jaw tend to hold the jaws apart.

The stationary jaw 20 is formed with a wire receiving groove 24 and the movable jaw with a projection 25 (see Fig. 8) opposed to said groove so that upon closing of the jaws the projection of the movable jaw enters the groove of the stationary jaw. Each of the grooves is provided with an enlargement 26 to facilitate the entrance of the wire, only one of which is shown.

Cams 27 and 28 move the movable jaw towards the stationary jaw to provide the vise. These cams are identical and are pivotally carried on bolts 29. A cam surface is secured to the bolt through a handle 30 which is also used to turn the cam to any of three positions. Each of the bottom surfaces of the cams has three depressions (not shown) for receiving a spring pressed plunger 31. The spring action on said plunger is slight and the depressions only serve as a locating means for the three positions. In the open position the flat face 32 of the cam is in contact with the end of the movable jaw. Upon slight turning of the cam handle the movable jaw is forced toward the stationary jaw until the projection 25 closes the open side of the groove, thus forming a hole into which the wire is threaded. Further movement of the cam causes the projection 25 to further enter the groove and securely hold the wire in desired position.

The lower vise 18 is securely held to the base 1 by bolts while the upper vise 19 is mounted on the bar 33 which is pivotally carried on the bolt 34.

The bar 33 has secured at its pivot end an insulating sleeve 35 through which passes the bolt 34. This bolt is formed on both the head and nut end with conical depressions into which the cone shaped end of the bolts 36 fit. This allows a friction controlled pivotal mounting and provides adjustment of the bar normal to the pivot pin. Adjustment of the upper vise to a correct position over the lower vise is thereby established. Electrical connection 37 is made from the contact 38 to the bar thus providing electrical contact with the upper movable vise, which is of course transferred to the wire to be welded.

An insulating stop 39 is positioned on the stationary jaw of the lower vise to space said vises the desired distance. This distance is exact and used in connection with a spacing pin determines the extent of the weld. A spring 46 holds the bar carrying the upper vise normally down on the stop 39.

A swinging arm 40 is pivoted to the base at 41 by the pivot pin 42 and rests normally in the groove 43 formed in the base back of the movable vise 19. This bar carries a spacing pin 44 and a wire contacting button 45. It is moved into position after the bar carrying the upper vise has been swung upward on its pivot.

That part of the apparatus directed to the building up and discharge of the welding current is illustrated diagrammatically in Fig. 9.

The source of current, an ordinary 110 volt power line shown at 47 supplies power to the transformer 48 and through that to the tube 49. This furnishes a full wave rectified direct current of approximately 500 volts at the points 50 and 51. A condenser 52 with a capacity of approximately 10 microfarads is charged by this current through the resistance 53 a unit of about 100,000 ohms. A transformer 54 is connected in circuit with the condenser and a low resistance unit 55 of about 2 ohms through the switch 56. This circuit allows a charge to slowly accumulate on the condenser plates, a charge which is accurately determined, and closing of the switch 56 discharges the condenser across the terminals 57 in a single, accurately determined flash which provides just the correct current for welding the particular wire. This discharge is uniform for each weld but may be varied by changing the condenser voltage or varying the resistance 55. Less current would not make the weld and more would melt the wire. Thus a welding is carried out without any definite knowledge of welding technique and by a machine which produces a uniform weld at each operation.

In the operation of the device the entire apparatus is mounted on a winding lathe and positioned so that the wire being wound passes across the face of the vises. Should it be necessary to join a second piece of wire to complete the winding the lathe is stopped, the end of the wire from the wound bar is threaded up through the lower vise. Just previous to the threading of the wire through the vise the pivoted bar 33 is swung upwards and the swinging arm brought into position so that the wire contacting button 45 is in alignment with the grooves of the vise. The pivoted vise is then dropped down being spaced from the lower vise by the spacing pin 44 (Fig. 5). The wire is then threaded up in the stationary vise and down in the pivoted vise until the ends of wire contact opposite sides of the button (Fig. 5). The ends of the wire are then honed with a stone to remove any dirt and prepare the ends for welding. The pivoted vise is then raised and the swinging arm returned to its recess. The pivoted vise is lowered until the projecting ends of the wire abut (Fig. 7). The welding current is then directed through the wires, the pivoted vise being connected to one of the terminals 57 and the stationary vise to the other. This produces an instantaneous welding flash that makes an even, uniform weld that in no way interferes with the winding of the wire about the bar.

The apparatus just described fulfills a need which allows the use of costly alloy wire to be used in the manufacture of short straight springs ordinarily made of steel. This alloy which is very expensive would be prohibitive to use for springs of this nature unless provision is made to eliminate the usual waste. By using the apparatus described only the spring having the actual weld is lost, exactly 1 inch, while the short lengths of wire, usually wasted are utilized.

What is claimed as new is:

1. A welding apparatus for butt welding fine wire comprising a base, a stationary vise secured to said base, a movable vise pivotally mounted on said base, each of said vises including a stationary jaw and a movable jaw, cam means for forcing said movable jaws against their respective stationary jaws, and springs normally holding the movable jaws away from the stationary jaws, each of said stationary jaws being formed with a groove to receive said wire, a tongue on each of said movable jaws entering said groove of the stationary jaws to lock said wire in desired position, the stationary vise and the pivoted vise being aligned so that at one position of the pivoted vise the grooves of the stationary jaws are in vertical alignment, a stop pin carried on the stationary jaw of the stationary vise engaging the stationary jaw of the pivoted vise to support the pivoted vise in groove aligning position and a gauge pivoted to said base and movable to a position between said vises and in alignment with said grooves to initially set said wire to be welded.

2. A welding apparatus for butt welding fine wire comprising a base, a stationary vise secured to said base, a movable vise pivotally mounted on said base, each of said vises including a stationary jaw and a movable jaw, cam means for forcing said movable jaws against their respective stationary jaws, and springs normally holding the movable jaws away from said stationary jaws, each of said stationary jaws being formed with a groove to receive said wire, a tongue on each of said movable jaws entering said groove of the stationary jaws to lock said wire in desired position, the stationary vise and the pivoted vise being aligned so that at one position of the pivoted vise the grooves of the stationary jaws are in vertical alignment, a gauge adapted to be removably positioned between said movable vise and said stationary vise to initially receive the ends of the wire to properly position said wire in the grooves, a stop pin carried on the stationary jaw of the stationary vise engaging the stationary jaw of the pivoted vise to support the pivoted vise in groove aligning position, said stop pin to limit the motion of the movable vise toward the stationary vise during the welding operation.

3. A welding apparatus for butt welding wire of rectangular cross section comprising a base, a stationary vise, a movable vise, each of said vises including a stationary jaw formed with a wire receiving groove and a movable jaw, cam means for forcing said movable jaws against their respective stationary jaws and springs normally holding the movable jaws away from the stationary jaws, a tongue on each of said movable jaws entering said groove of the stationary jaws to lock said wire in desired position, the stationary vise and the pivoted vise being aligned so that the position of the vises after the weld is made is such that the groove of the stationary vise and the groove of the pivoted vise are in vertical alignment, a stop pin carried on the stationary jaw of the stationary vise to arrest the movement of said pivoted vise to so align certain grooves and means adapted to be preliminarily brought between said vises and support said vises at a predetermined distance from each other, said means carrying a gauge which determines the amount of wire projecting beyond the grooves of both the stationary vise and the pivoted vise, said means being removable previous to the welding operation.

WILLIAM O. BENNETT, Jr.